United States Patent
Maier et al.

(10) Patent No.: US 11,117,621 B2
(45) Date of Patent: Sep. 14, 2021

(54) SIDE WALL REAR COMPONENT AND PASSENGER VEHICLE

(71) Applicants: Bayerische Motoren Werke Aktiengesellschaft, Munich (DE); MAGNA STEYR Fahrzeugtechnik AG & Co KG, Graz (AT)

(72) Inventors: Maximilian Maier, Munich (DE); Philipp Deck, Alling (DE); Rainer Pichlmaier, Gammelsdorf (DE); Thomas Gimpel, St. Marein (AT); Gernot Krammer, Hanoi (VN)

(73) Assignees: Bayerische Motoren Werke Aktiengesellschaft, Munich (DE); MAGNA STEYR Fahrzeugtechnik AG & Co KG, Graz (AT)

( * ) Notice: Subject to any disclaimer, the term of this patent is extended or adjusted under 35 U.S.C. 154(b) by 10 days.

(21) Appl. No.: 16/754,407

(22) PCT Filed: Oct. 11, 2018

(86) PCT No.: PCT/EP2018/077745
§ 371 (c)(1),
(2) Date: Apr. 8, 2020

(87) PCT Pub. No.: WO2019/072972
PCT Pub. Date: Apr. 18, 2019

(65) Prior Publication Data
US 2020/0307705 A1    Oct. 1, 2020

(30) Foreign Application Priority Data
Oct. 12, 2017 (DE) .......................... 102017218193.1

(51) Int. Cl.
*B62D 25/02*      (2006.01)

(52) U.S. Cl.
CPC ................................. *B62D 25/02* (2013.01)

(58) Field of Classification Search
CPC ............................... B62D 25/04; B62D 25/02
(Continued)

(56) References Cited

U.S. PATENT DOCUMENTS

2016/0121936 A1\*    5/2016   Patberg ................ B62D 29/004
                                                                             296/191
2016/0257345 A1    9/2016   Hasegawa

FOREIGN PATENT DOCUMENTS

DE            2053151 B      3/1972
DE    102004059476 A1      6/2006
(Continued)

OTHER PUBLICATIONS

Search Report of German Priority Application, dated Oct. 12, 2017.
(Continued)

*Primary Examiner* — Pinel E Romain
(74) *Attorney, Agent, or Firm* — FisherBroyles, LLP; Craig W. Mueller

(57) ABSTRACT

The invention relates to a side wall rear component (14) for a passenger vehicle (13), having at least one outer wall (4) and at least one wall reinforcement (15) reinforcing the outer wall (4) on the inner side (5) thereof. In order to ensure that a front-side end portion of the side wall rear component (14), which shifts on the front side in the event of a rear-end collision, reliably pushes on the inside via a rear-side end portion of a vehicle door (3), which is arranged on a front side with respect to the side wall rear component (14), at least one sliding slope (17) is arranged on a front-side end portion (16) of the wall reinforcement (15), the front-side end of which sliding slope is spaced apart in a transverse direction (Y) of the vehicle further from an outer surface
(Continued)

Figure 1:
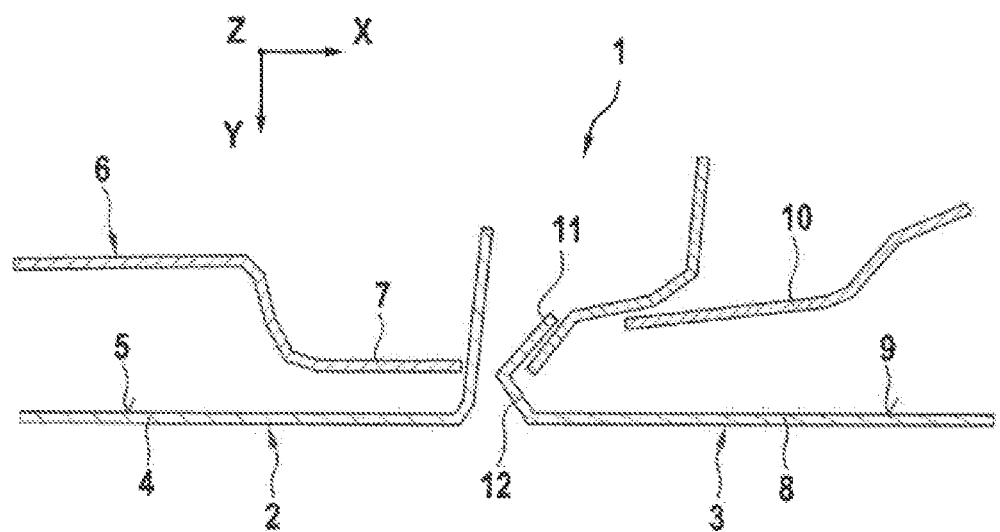

(18), which forms a vehicle outer skin portion, of the outer wall (4) than a rear-side end of the sliding slope (17).

5 Claims, 1 Drawing Sheet

(58) Field of Classification Search
USPC ........................................................ 296/191
See application file for complete search history.

(56) References Cited

FOREIGN PATENT DOCUMENTS

| DE | 102008062504 A1 | 6/2010 |
|----|-----------------|--------|
| DE | 102011050514 A1 | 11/2012 |
| DE | 102012003760 A1 | 8/2013 |
| DE | 102015106812 A1 | 11/2016 |
| EP | 1880924 A2 | 1/2008 |

OTHER PUBLICATIONS

International Search Report of Parent PCT Application, dated Jan. 11, 2019.

* cited by examiner

SIDE WALL REAR COMPONENT AND PASSENGER VEHICLE

This application is a national stage application under 35 U.S.C. 371 and claims the benefit of PCT Application No. PCT/EP2018/077745, having an international filing date of Oct. 11, 2018, which designated the United States, which PCT application claimed the benefit of German Patent Application No. 102017218193.1, filed Oct. 12, 2017, the disclosure of each of which are incorporated by reference herein.

The invention relates to a side wall rear component for a passenger car, comprising at least one outer wall and at least one wall reinforcement that reinforces the outer wall on the inside thereof.

The invention furthermore relates to a passenger car comprising at least one side wall rear component, which is fixed to a B-pillar of the passenger car, and a vehicle door, which is arranged to be in front of the side wall rear component and fixable to the B-pillar on the rear side in a closed position by means of a door lock.

In the event of a rear-end accident of a passenger car, mechanical stresses act on the rear side of the passenger car. As a result, a side wall rear component of the body of the passenger car may be mechanically stressed, so that the side wall rear component is displaced forward to some extent. In this case, a front side end portion of an outer wall of the side wall rear component, wherein the outer wall forms a vehicle outer shell portion, can be moved outwards over a rear side end portion of a vehicle door, which is arranged in front of the side wall rear component and in a closed position, in which the vehicle door is fixed to a B-pillar of the passenger car on a rear side via a door lock. In this case, it is also possible that, in addition, a wall reinforcement of the side wall rear component, wherein the wall reinforcement reinforces the outer wall on the inside thereof, may be moved outwards over the rear side end portion of the vehicle door. Both processes make it more difficult or impossible to move the vehicle door out of its closed position and into an open position, which must be prevented absolutely for safety reasons.

It is therefore essential to design a side wall rear component and/or a vehicle door that is arranged in front thereof in such a way that, in the event of a rear-end accident, the side wall rear component that is displaced on the front side is not moved outwards over the rear side end portion of the vehicle door but displaced inwards over the rear side end portion of the vehicle door. As a result, the vehicle door is not blocked and can be moved out of its closed position and into an open position.

In order to achieve this, it is known, for example, to design a rear side door flange of a vehicle door and a front side flange of a side wall rear component, so that a slide-down chamber results, by means of which, in the event of a front side displacement in the direction of the vehicle door and by means of the contacting between the side wall rear element and the vehicle door, the side wall rear element is pushed inwards over the rear side end portion of the vehicle door. However, this embodiment of the vehicle door and of the side wall rear component greatly interferes with the design of sealing joints between the side wall rear component and the vehicle door or the sealing concept, and is therefore not achievable in many vehicles.

Furthermore, it is known, in the case of a side wall rear component that is screwed to car body framework, the screw connections are so arranged, that the screw connections loosen above a specified loosening force. As a result, a side wall rear component, the front side end portion of which has been pushed outwards over the rear side end portion of the vehicle door in the event of a rear-end accident, can be released from the car body framework, if a door opening force acting at the vehicle door reaches or exceeds the loosening force, so that the vehicle door can be moved out of its closed position and into an open position. However, this approach is inconsistent with requirements with respect to the service life of the car body and the side wall rigidity and is therefore very hard to be implemented robustly.

An object of the invention is while preventing the disadvantages described above to ensure, that a front side end portion of a side wall rear component, which is displaced forwards in the event of a rear-end accident, is reliably pushed inwards over a rear side end portion of a vehicle door, which is arranged to be in front of the side wall rear component.

This object is achieved by the independent claims. Advantageous embodiments are set out in the dependent claims, the following description and the drawings, wherein it is possible for said embodiments to constitute a developed or advantageous aspect of the invention in each case taken alone or in various combinations of at least two embodiments with each other.

A side wall rear component according to the invention for a passenger car comprises at least one outer wall and at least one wall reinforcement that reinforces the outer wall on the inside thereof, wherein at least one sliding chamfer is arranged at a front side end portion of the wall reinforcement, the front side end of the chamfer in a vehicle transverse direction is spaced apart further from an outer surface, which forms a vehicle outer shell portion, of the outer wall than a rear side end of the sliding chamfer.

If a front displacement of the side wall rear component takes place in the event of a rear-end accident, the outer wall of the side wall rear component is first plastically deformed by means of physical contact with the rear side end portion of the vehicle door that is in its closed position, until an angled flange portion of the outer wall rests on the sliding chamfer of the wall reinforcement and in this case assumes a corresponding shape and a corresponding orientation. Through the established indirect physical contact between the rear side end portion of the vehicle door and the outwardly oriented sliding chamfer via the flange portion of the outer wall in the event of further front side displacement of the side wall rear component, a transverse force is generated, which acts inwards in the vehicle transverse direction on the front side end portion of the side wall rear component and pushes the front side end portion of the side wall rear component inwards. In this case, the front side end portion of the side wall rear component is supported at the rear side end portion of the vehicle door, which is secured by means of a door lock at the B-pillar of the passenger car and thereby in its closed position. This reliably ensures that the front side end portion of the side wall rear component, which is displaced forwards in the event of a rear-end accident, is reliably pushed inwards, over the rear side end portion of the vehicle door, which is arranged to be in front of the side wall rear component. Within the context of the application, the terms "inner" and "outer" relate to the inside of the passenger car or the outside surroundings of the passenger car, respectively.

At the front side end portion of the wall reinforcement, one sliding chamfer that is continuous in the vehicle height direction can be arranged, or two or more sliding chamfers can be arranged to be spaced apart in the height direction. Since the front side end of the sliding chamfer is spaced further in the vehicle transverse direction from the outer surface, which forms the vehicle outer shell portion, of the outer wall than the rear side end of the sliding chamfer, the sliding chamfer is oriented outwards and thus extends in the forward travel direction from the outside to the inside. As a result, a spacing between the front side end of the sliding chamfer and a vehicle longitudinal central axis is smaller than a spacing between the rear side end of the sliding chamfer and the vehicle longitudinal central axis, when the side wall rear element is arranged conventionally at the passenger car. The sliding chamfer can be formed either by a component that is produced separately and connected to the wall reinforcement or by the wall reinforcement itself, wherein the latter is associated with a weight advantage.

Since, according to the invention, no structural amendments to a flange of the side wall rear component and/or to a flange of the vehicle door are required, the invention does not interfere in a disadvantageous manner with the relevant joint pattern or sealing concept. As a result, the invention can be implemented in any passenger car. Furthermore, in order to implement the invention in the case of a side wall rear component that is screwed to car body framework, the screw connections must not be so interpreted that the screw connections loosen above a specified loosening force. Therefore, the invention is not inconsistent with the requirements with respect to the service life of the car body and the side wall rigidity. Furthermore, the weight and cost requirement for implementing the invention is very low.

The side wall rear component can be adapted in a triple-shelled manner, wherein an outer shell is formed by the outer wall, an inner shell is formed by an inner wall, and an intermediate shell arranged between the outer shell and the inner shell is formed by the wall reinforcement, wherein the outer shell and the inner shell is connected to the intermediate shell respectively. The side wall rear component can form a rear fender, which can extend continuously from the rear end of the passenger car as far as the vehicle door.

The passenger car can, for example, be a two-door passenger car, in particular a Cabriolet or a Coupe.

According to an advantageous embodiment, the front side end portion is adapted to be convex in a horizontal longitudinal sectional plane at least in part on a side facing the outer wall. As a result, the front side end portion of the wall reinforcement can form a convex sliding chamfer at the front, forming the sliding chamfer by itself. Via the convex design of the front side end portion of the wall reinforcement, the rigidity of the wall reinforcement with respect to bending forces about a horizontal longitudinal bending axis is increased. The horizontal longitudinal sectional plane is in parallel with a plane spanned by the vehicle longitudinal direction (X-direction) and the vehicle transverse direction (Y-direction).

According to a further advantageous embodiment, the sliding chamfer comprises in the horizontal longitudinal sectional plane at least two sliding portions that transit into each other and are arranged to be angled relative to one another, wherein an angle between a front side sliding portion and the vehicle transverse direction is smaller than an angle between a rear end sliding portion and the vehicle transverse direction. Accordingly, the sliding chamfer can thus comprise two or more sliding portions which extend at different angles to the vehicle longitudinal axis. Alternatively, the sliding chamfer can be adapted to be curved continuously or to have a constant course.

A passenger car according to the invention comprises at least one side wall rear component, which is fixed to a B-pillar of the passenger car, and a vehicle door, which is arranged to be in front of the side wall rear component and fixable to the B-pillar on the rear side in a closed position by means of a door lock, wherein the side wall rear component is adapted according to one of the above-mentioned embodiments or any desired combination of at least two of said embodiments together.

The advantages mentioned above with respect to the side wall rear component are associated with the passenger car. The passenger car can, for example, be a two-door passenger car, in particular a Cabriolet or a Coupe.

According to an advantageous embodiment, at least one sliding chamfer is arranged at a rear side end portion of the vehicle door, at least in part in front of the sliding chamfer arranged at the wall reinforcement in the case that the vehicle door is in the closed position, and extends in parallel with at least a portion of the sliding chamfer that is arranged at the wall reinforcement. This embodiment optimizes the indirect physical contact between the sliding chamfer of the wall reinforcement of the side wall rear component and the sliding chamfer of the vehicle door, in particular with extensive areas, in order to reliably ensure the transmission of inwardly directed transverse forces to the front side end portion of the side wall rear component.

Further details, features and advantages of the invention can be found in the following description and the figures. It shows:

FIG. 1 a schematic view of a side portion of a conventional passenger car; and

Figure 2:
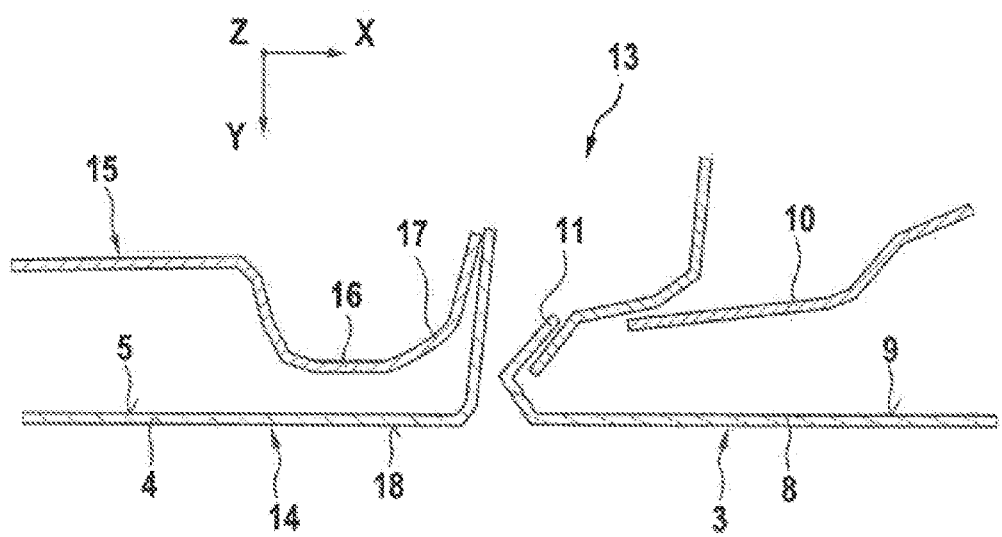

FIG. 2 a schematic view of a side portion of an embodiment for a passenger car according to the invention.

In the figures, identical or functionally identical components are provided with the same reference signs. Repeated description of said components can be omitted.

FIG. 1 is a schematic view of a right-hand side portion of a conventional passenger car 1, which is adapted as a two-door motor vehicle. A horizontal longitudinal sectional plane of the side portion is shown.

On the shown right-hand vehicle-side, the passenger car 1 comprises a side wall rear component 2 that is fixed to a B-pillar, which is not shown, of the passenger car 1 in a manner that is not shown. Furthermore, the passenger car 1 comprises a vehicle door 3, which is arranged to be in front of the side wall rear component 2 and fixed to the B-pillar in the shown closed position on the rear side by means of a door lock, which is not shown.

The side wall rear component 2 comprises an outer wall 4 and a wall reinforcement 6 that reinforces the outer wall 4 on the inside 5 thereof. The wall reinforcement 6 comprises a front side end portion 7 that extends and terminates in parallel with a vehicle longitudinal direction X.

The vehicle door 3 comprises an outer wall 8 and a wall reinforcement 10 that reinforces the outer wall 8 on the inside 9 thereof. Two oppositely oriented sliding chamfers 11 and 12 that transit into each other in a transition region are arranged at a rear side end portion of the vehicle door 3 or the outer wall 8. When the vehicle door 3 is in the closed position, the transition region between the two sliding chamfers 11 and 12 is arranged in front of the front side end of the wall reinforcement 6 of the side wall rear component 2.

If, in the event of a rear-end accident, the side wall rear component 2 is displaced forwards, namely to the right in FIG. 1, the front side end of the wall reinforcement 6 of the side wall rear component 2 comes into indirect physical contact with the transition region between the two opposing sliding chamfers 11 and 12 at the outer wall 8 of the vehicle door 3 through the outer wall 4 of the side wall rear component 2. This unstable physical contact can cause that the side wall rear component 2, which is displaced on the front side and moves forwards, moves over either the sliding chamfer 11 or the sliding chamfer 12. In the first case, it leads to a desired pushing of the front side end portion of the side wall rear component 2 inwards over the rear side end portion of the vehicle door 3. In the latter case, it results in an undesired pushing of the front side end portion of the side wall rear component 2 outwards over the rear side end portion of the vehicle door 3. As a result, opening of the vehicle door 3 after the rear-end accident could be very difficult or impossible, which must be prevented absolutely. Therefore, in the case of the passenger car 1 shown in FIG. 1, it is not possible to reliably ensure that the front side end portion of the side wall rear component 2 is not pushed outwards over the rear side end portion of the vehicle door 3 in the event of a rear-end accident.

FIG. 2 is a schematic view of a side portion of an embodiment for a passenger car 13 according to the invention, which is adapted as a two-door motor vehicle. A horizontal longitudinal sectional plane of the side portion is shown.

On the shown right-hand vehicle-side, the passenger car 13 comprises a side wall rear component 14 that is fixed to a B-pillar, which is not shown, of the passenger car 13 in a manner that is not shown. Furthermore, the passenger car 13 comprises a vehicle door 3, which is arranged to the front of the side wall rear component 14 and is fixed to the B-pillar on the rear side in the shown closed position by means of a door lock, which is not shown.

The side wall rear component 14 comprises an outer wall 4 and a wall reinforcement 15 that reinforces the outer wall 4 on the inside 5 thereof. A sliding chamfer 17 is arranged at a front side end portion 16 of the wall reinforcement 15, wherein the front side end of the chamfer is spaced apart further in a vehicle transverse direction Y from an outer surface 18, which extends along a straight line in FIG. 2 and forms a vehicle outer shell portion, of the outer wall 4 than a rear side end of the sliding chamfer 17. In this case, in the shown horizontal longitudinal sectional plane, the front side end portion 16 is adapted to be convex on a side facing the outer wall 4. Alternatively, the sliding chamfer 17 comprises, in the horizontal longitudinal sectional plane, at least two sliding portions, which are not shown and transit into each other and arranged to be angled relative to each other, wherein an angle between a front side sliding portion and the vehicle transverse direction Y is smaller than an angle between a rear sliding portion and the vehicle transverse direction Y.

The vehicle door 3 comprises an outer wall 8 and a wall reinforcement 10 that reinforces the outer wall 8 on the inside 9 thereof. A sliding chamfer 11 is arranged on a rear side end portion of the vehicle door 3, to be in front of the sliding chamfer 17 arranged at the wall reinforcement 15 of the side wall rear component 14, when the vehicle door 3 is in the shown closed position and extends in parallel with the sliding chamfer 17 that is arranged at the wall reinforcement 15.

If, in the event of a rear-end accident, the side wall rear component 14 is displaced forwards, namely to the right in FIG. 2, the sliding chamfer 17 of the wall reinforcement 15 of the side wall rear component 14 comes into indirect physical contact with the sliding chamfer 11 at the rear side end portion of the vehicle door 3, through the outer wall 4 of the side wall rear component 14. As a result of said physical contact, the front side end portion of the side wall rear component 14, which further moves forwards and is displaced on the front side, slides over the sliding chamfer 11 and as a result is pushed inwards, namely in the direction of a vehicle longitudinal central axis, which is not shown. An opposing movement of the front side end portion of the side wall rear component 14 outwards is reliably prevented by the indirect physical contact between the sliding chamfers 11 and 17. Consequently, in the case of the passenger car 13, it is possible to reliably ensure that the front side end portion of the side wall rear component 14 is not pushed outwards over the rear side end portion of the vehicle door 3 in the event of a rear-end accident.

LIST OF REFERENCE SIGNS 1 passenger car
2 side wall rear component
3 vehicle door
4 outer wall of 2
5 inside of 4
6 wall reinforcement of 2
7 front side end portion of 6
8 outer wall of 3
9 inside of 8
10 wall reinforcement of 3
11 sliding chamfer on 3
12 sliding chamfer on 3
13 passenger car
14 side wall rear component
15 wall reinforcement of 14
16 front side end portion of 15
17 sliding chamfer on 15
18 outer surface of 4

The invention claimed is:

1. A side wall rear component for a passenger car, comprising:
   at least one outer wall and at least one wall reinforcement that reinforces the outer wall on the inside thereof; and
   wherein at least one sliding chamfer is arranged at a front side end portion of the wall reinforcement, and the front side end portion of the sliding chamfer is spaced apart further from an outer surface of the outer wall, which forms a vehicle outer shell portion, in a vehicle transverse direction (Y), than a rear side end of the sliding chamfer.

2. The side wall rear component according to claim 1, wherein the front side end portion in a horizontal longitudinal sectional plane is adapted to be convex at least in part on a side facing the outer wall.

3. The side wall rear component according to claim 2, wherein the sliding chamfer comprises in the horizontal longitudinal sectional plane at least two sliding portions that are merged with each other and arranged to be angled relative to each other, wherein an angle between a front side sliding portion and the vehicle transverse direction (Y) is smaller than an angle between a rear sliding portion and the vehicle transverse direction.

4. A passenger car, comprising:
   at least one side wall rear component, which is fixed to a B-pillar of the passenger car;
   a vehicle door, which is arranged to be in front of the side wall rear component and fixable to the B-pillar in a closed position in back of the vehicle door side wall; and
   wherein the side wall rear component, comprises
   at least one outer wall and at least one wall reinforcement that reinforces the outer wall on the inside thereof; and wherein at least one sliding chamfer is arranged at a front side end portion of the wall reinforcement, and the front side end portion of the sliding chamfer is spaced apart further from an outer surface of the outer wall, which forms a vehicle outer shell portion, in a vehicle transverse direction (Y) than a rear side end of the sliding chamfer.

5. The passenger car according to claim 4, further comprising at least one vehicle door sliding chamfer arranged at a rear side end portion of the vehicle door;
   wherein the vehicle door sliding chamfer is arranged at least in part in front of the sliding chamfer arranged at the at least one wall reinforcement, when the vehicle door is in the closed position; and
   wherein the vehicle door sliding chamfer extends in parallel with at least a portion of the sliding chamfer arranged at the wall reinforcement.

\* \* \* \* \*